(12) United States Patent
Macchi et al.

(10) Patent No.: US 7,490,542 B2
(45) Date of Patent: Feb. 17, 2009

(54) CARTRIDGE FOR COFFEE AND SOLUBLE PRODUCTS AND RELATIVE METHOD OF PRODUCING A BEVERAGE AND APPARATUS FOR EXTRACTING A BEVERAGE

(75) Inventors: Edoardo Macchi, Ossona (IT); Marco Sagliaschi, Novara (IT)

(73) Assignee: I.T.A.CA S.r.l., Arluno (MI) (IT)

(*) Notice: Subject to any disclaimer, the term of this patent is extended or adjusted under 35 U.S.C. 154(b) by 550 days.

(21) Appl. No.: 11/052,856

(22) Filed: Feb. 9, 2005

(65) Prior Publication Data
US 2005/0172822 A1 Aug. 11, 2005

(30) Foreign Application Priority Data

| May 13, 2004 | (IT) | ............................ MI2004A0961 |
| Feb. 11, 1920 | (EP) | ................................ 04425089 |

(51) Int. Cl.
A47J 31/00 (2006.01)
B65B 29/02 (2006.01)
(52) U.S. Cl. .............................. 99/295; 99/323; 426/77; 426/433
(58) Field of Classification Search .................. 99/295, 99/323, 302 R, 289 P; 426/77, 82, 112, 115, 426/433
See application file for complete search history.

(56) References Cited

U.S. PATENT DOCUMENTS

| 3,589,272 | A | * | 6/1971 | Bouladon et al. ............. 99/295 |
| 4,136,202 | A | * | 1/1979 | Favre ........................... 426/77 |
| 4,386,109 | A | * | 5/1983 | Bowen et al. ................ 426/241 |
| 4,389,925 | A | * | 6/1983 | Piana ......................... 99/289 R |
| 4,644,856 | A | * | 2/1987 | Borgmann .................... 99/295 |
| 5,242,702 | A | * | 9/1993 | Fond ........................... 426/433 |
| 5,472,719 | A | | 12/1995 | Favre et al. |
| 5,656,311 | A | | 8/1997 | Fond |
| 5,875,704 | A | * | 3/1999 | Levi et al. ..................... 99/295 |
| 5,948,455 | A | * | 9/1999 | Schaeffer et al. .............. 426/77 |
| 6,832,542 | B2 | * | 12/2004 | Hu et al. .................. 99/302 R |
| 6,948,420 | B2 | * | 9/2005 | Kirschner et al. ............. 99/295 |
| 2004/0112223 | A1 | * | 6/2004 | De'Longhi .................... 99/279 |
| 2005/0150390 | A1 | * | 7/2005 | Schifferle .................... 99/295 |

FOREIGN PATENT DOCUMENTS

| EP | 1 364 605 | 11/2003 |
| EP | 1 364 605 A | 11/2003 |
| EP | 1 555 218 | 7/2005 |

* cited by examiner

Primary Examiner—Reginald L Alexander
(74) Attorney, Agent, or Firm—Nixon & Vanderhye

(57) ABSTRACT

A cartridge (1) for coffee and for soluble products is described, which comprises a container (2) designed to contain the coffee or the soluble product, a lid (6) placed on the top of the container so as to define an upper wall designed to allow hot water under pressure to enter the container (2) in order to produce the beverage, a filter (4) designed to be positioned inside the container (2) above a bottom wall (20) of the container. The bottom wall (20) of the container has at least one breakable portion (28) designed to break when the liquid inside the cartridge reaches a pre-set pressure, so as to form at least one aperture (130) to allow the beverage to be extracted from the cartridge (1)a.

9 Claims, 8 Drawing Sheets

CARTRIDGE FOR COFFEE AND SOLUBLE PRODUCTS AND RELATIVE METHOD OF PRODUCING A BEVERAGE AND APPARATUS FOR EXTRACTING A BEVERAGE

The present invention refers to a cartridge or pod for containing coffee or soluble products for the preparation of beverages in general, in particular coffee or products that are soluble in hot water under pressure, such as products in a granular or powder form, for example, barley, powdered milk and the like, or leaf-based products such as, for example, camomile tea, tea, herbal teas and the like.

The present invention refers also to a method of producing a beverage by using such a cartridge and to an apparatus for producing a beverage using said cartridge.

Specific reference to a cartridge to contain powdered coffee will be made herein, it being understood that such a cartridge can be used to contain other soluble products for the production of other drinks.

Essentially two types of cartridges for containing powdered coffee are available on the market: hard cartridges and flexible cartridges.

The hard cartridges, having a substantially cylindrical or frustoconical shape, comprise two half-shells of hard plastic material that are sealed together using heat or ultrasound. The powdered coffee is placed inside the cartridge together with a filter which is in contact with the bottom part of the cartridge.

The bottom wall and/or the top wall of the cartridge usually have holes in them. Thus, when the cartridges is placed in a drinks extraction machine, hot water under pressure is injected onto the top wall of the cartridge and passes through the holes in the top wall to reach the powdered product inside the cartridge, retaining the aromas so as to produce the beverage. The beverage then passes through the filter which retains the product in powder form and leaves through the holes in the bottom wall of cartridge, to be collected in a cup to be drunk by the user.

This type of rigid cartridge presents the substantial drawback that the product inside it is exposed to the outside environment due to the holes provided in the top wall and/or in the bottom wall of the cartridge, holes which also prevent high pressures from being maintained before the beverage is extracted.

As is known, products like powdered coffee should be vacuum packed in airtight containers, otherwise they lose their fragrance and aroma in a very short space of time. For this reason, hard cartridges require further airtight packaging that protects the product from the contact with the outside. Such packaging is usually made with a wrapper of plastic and/or metal film that encloses one or more cartridges. The hard cartridges therefore entail extra costs due to packaging thereof and to the presence of the packaging wrapper.

Flexible cartridges are also known to the art, comprising a flexible cylindrical or frustoconical container of reduced thickness which is open at the top for the introduction of the powered product. A breakable membrane is heat-sealed to the top surface of these containers, so that the powdered product is sealed tightly inside the flexible cartridge.

When the flexible cartridge is inserted into the hot drinks extraction machine, a plate on the device pierces the membrane at the top of the cartridge, thus introducing the hot water, and a punch on the device pierces the bottom wall of the cartridge, allowing the beverage to be extracted from the cartridge. Said beverage passes through a filter in the machine, before being collected in a cup by the user.

This type of flexible, airtight cartridge does on require any further airtight packaging to conserve the aroma of the product. In fact, said flexible airtight cartridges are usually packed in cardboard boxes containing ten or more cartridges, thus providing a significant saving in packaging costs.

Nevertheless, such a flexible cartridge presents some drawbacks due to the poor quality of the beverage obtained. In fact, when the hot water under pressure is injected into the cartridge, the beverage must be extracted immediately, since the flexible material of which the cartridge is made cannot withstand such a pressure and such a temperature for long. As a result, with such a short time of exposure to pressure inside the cartridge, the aromas of the product do not dissolve completely in the water and thus a beverage of poor quality is obtained.

Moreover, flexible cartridges of this type cause the filter of the hot drinks extraction machine to get blocked, resulting in the need for frequent maintenance to and/o replacement of said filter of the drinks extraction machine.

The object of the present invention is to overcome the drawbacks of the prior art by providing a cartridge for coffee or soluble products that is practical, cheap and easy to produce.

Another object of the present invention is to provide a cartridge for coffee or soluble products that allows high quality beverages to be produced.

Yet another object of the present invention is to provide a cartridge for coffee or for soluble products that can be used in an extremely simple and cheap drinks extraction machine.

Yet another object of the present invention is to provide a cartridge for coffee or for soluble products that is versatile and can be used in various types of traditional drinks extraction machines.

Another object of the present invention is to provide a method for production of beverages through extraction of the beverage from a cartridge for coffee or for soluble products that ensures that the beverage is of good quality.

Yet another object is to provide an apparatus for extraction of a beverage suitable to be used with a cartridge according to the invention.

The cartridge for coffee or for soluble products according to the invention comprises a container designed to hold coffee or a soluble product. A filter is placed inside the container, on the bottom wall, designed to allow the beverage to pass through but to prevent the passage of the coffee or of the soluble product. The coffee or the soluble product is placed above the filter and then the container is closed by means of a lid with micro-perforations to allow the hot water under pressure to pass through.

The peculiar characteristic of the invention is represented by the fact that the bottom wall of the cartridge has breakable portions which yield when the inside of the cartridge reaches a pre-set pressure, so as to create an aperture for the extraction of the beverage, which can flow into a cup beneath.

In order to produce the beverage, hot water under pressure is first injected into the cartridge through the micro-perforations in the lid. The inside of the cartridge is then pressurised for an optimal length of time until the breakable portions of the bottom of the container give way and the extraction of the beverage from the cartridge thus occurs.

Such a type of cartridge presents the advantage that, according to the type of weakening provided in the bottom of the cartridge, pressurization of the cartridge is allowed for an optimal time, long enough to cause the aromas and the fragrances of the coffee or of the soluble product to be released into the beverage, resulting in a beverage of excellent quality.

Further characteristics of the invention will be made clearer by the detailed description that follows, with reference to a purely exemplifying and therefore nonlimiting embodiment thereof, illustrated in the appended drawings, in which.

The cartridge for coffee or for soluble products, made according to the invention, is described with the aid of the figures.

Figure 1:
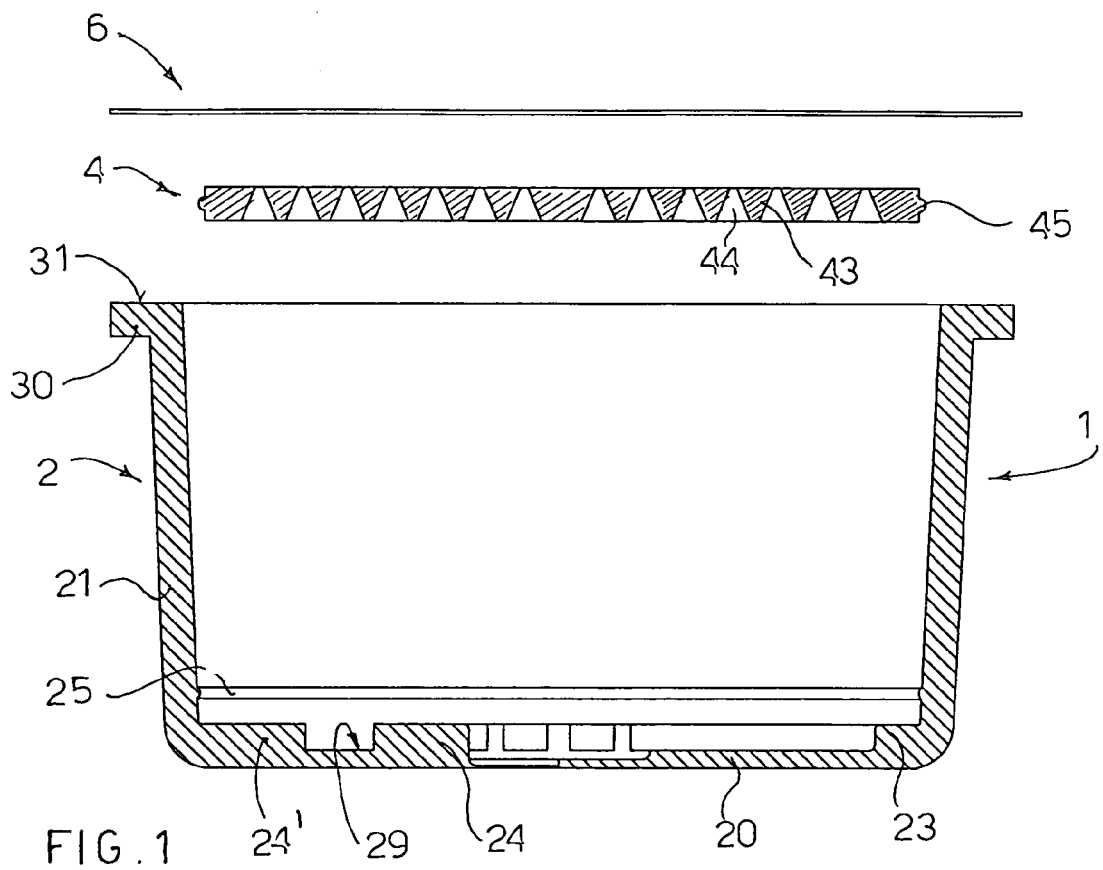
FIG. 1 is an exploded, axial sectional view, illustrating the cartridge for coffee or for soluble products according to the invention.

FIG. 1 shows an exploded view of a cartridge according to the invention, designated as a whole with reference numeral 1.

The cartridge 1 comprises a container 2 designed to contain coffee or a soluble product which can be in the form of granules, powder or leaves, a filter 4 designed to be positioned inside the container 2 and a lid 6 designed to close the container 2.

Figure 2:
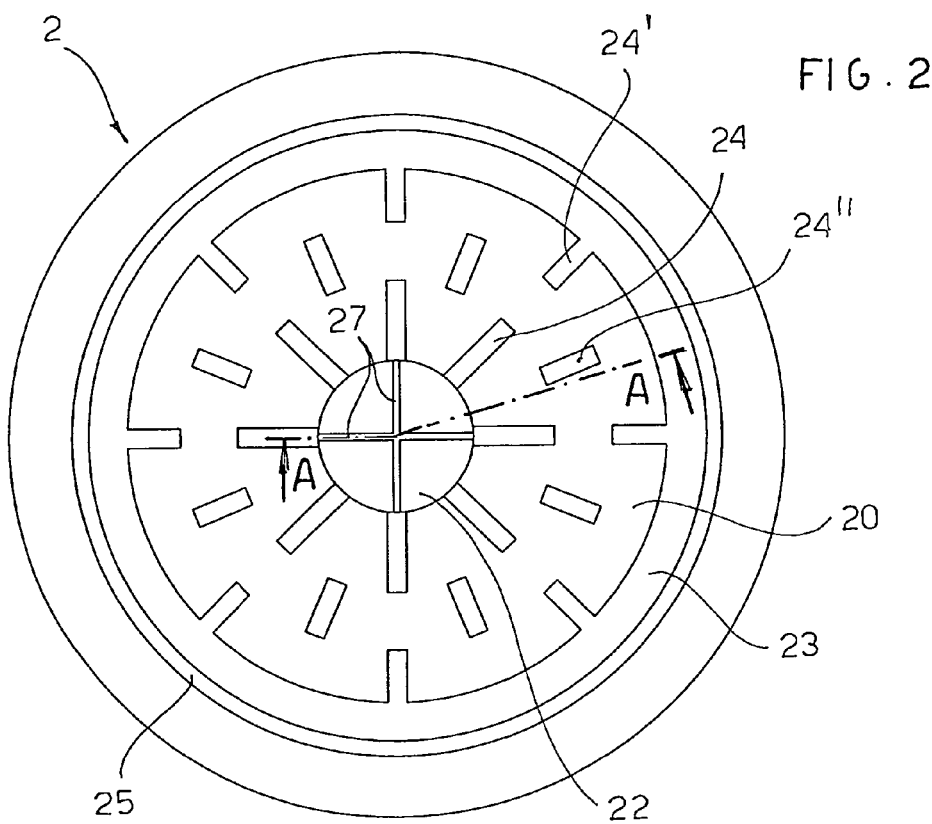
FIG. 2 is a top plan view illustrating the container of the cartridge of FIG. 1.
Figure 2A:
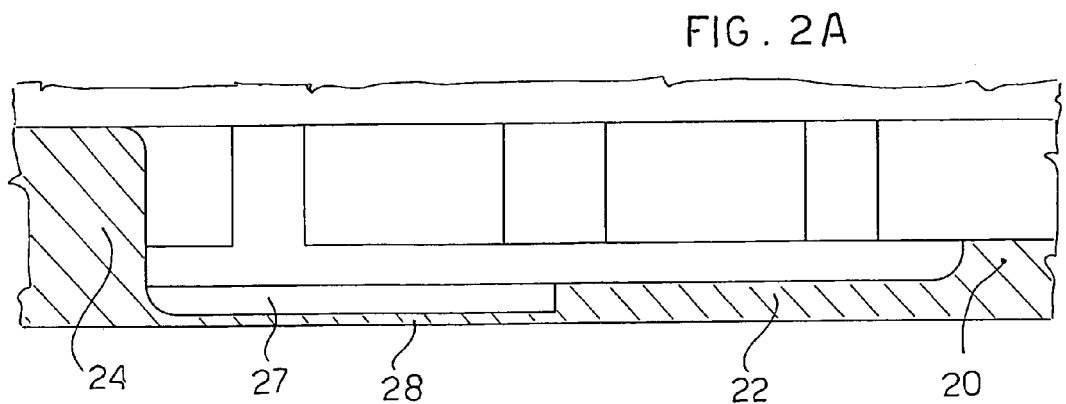
FIG. 2A is an enlarged sectional view, partially broken off, illustrating the central part of the bottom of the cartridge, taken along the plane of section A-A of FIG. 2.

With reference also to FIGS. 2 and 2A, the container 2 is shaped as a cylindrical or frustoconical cup open at the top. The container 2 comprises a substantially disc-shaped bottom wall 20 from which rises a slightly conical sidewall 21.

The bottom wall 20 has a thinner central portion 22 so as to form a circular portion of weakening, recessed in the inner surface of the bottom wall 20. In the inside surface of the central portion of weakening 22 there are some grooves 27 which define breakable portions of material 28 which are thinner than the weakened central portion 22.

By way of example, FIG. 2 show two grooves 27 arranged in a cross, so as to divide the weakened central portion 22 into four circular segments defined by angle of 90° at the centre.

The bottom wall 20 further has a thicker peripheral part 23, so as to form a thicker annular portion in contact with the sidewall 21 and projecting upward from the inner surface of the bottom wall 20.

On the inside surface of the bottom wall 20, between the weakened central portion 22 and the thickened peripheral portion 23, there are some upwardly projecting radial ribs (24, 24', 24") having the same thickness as that of the thicker peripheral portion 23.

As shown in FIG. 2, there are eight more internal ribs 24, arranged equidistantly from each other at an angle of 45°, which radiate outwards from the central recessed portion 22. In the same direction as the more internal ribs 24, there are another eight more external ribs 24' which radiate inwards from the thickened peripheral part 23. The more internal ribs 24 are spaced apart from the more external ribs 24' so as to leave gaps 29 for the passage of liquids.

Moreover, on the bottom 20 of the container there are another eight central ribs 24" offset with respect to the radial direction of the more internal ribs 24 and of the more external ribs 24' and disposed in register with the circumferential direction of the gaps 29.

As shown in FIGS. 1 and 2 a protruding ring or collar 25, set near the bottom 20 and protruding radially inward, is provided on the inner surface of the sidewall 21 of the container 2.

The sidewall 21 of the container has an annular top rim 30 projecting outward so as to form a substantially flat top surface 31.

The container 2 is made in a single piece by injection moulding of hard plastic material, such as for example plastic for alimentary use and in particular polypropylene. The bottom wall 20 and the sidewall 21 of the container 2 do not have any perforation and their thickness is calculated to make sure that the container 2 has a certain rigidity so as to be able to withstand high pressure even for long periods of time.

As shown in FIG. 1, the filter 4 is inserted into the container 2 so that it rests on the ribs (24, 24', 24") of the bottom of the container on the upper surface of the peripheral thickening 23 of the bottom wall 20. In this way, the beverage to be extracted can circulate freely between the filter 4 and the bottom 20 of the container 2 both radially and non-radially through the gaps 29.

Figure 3:
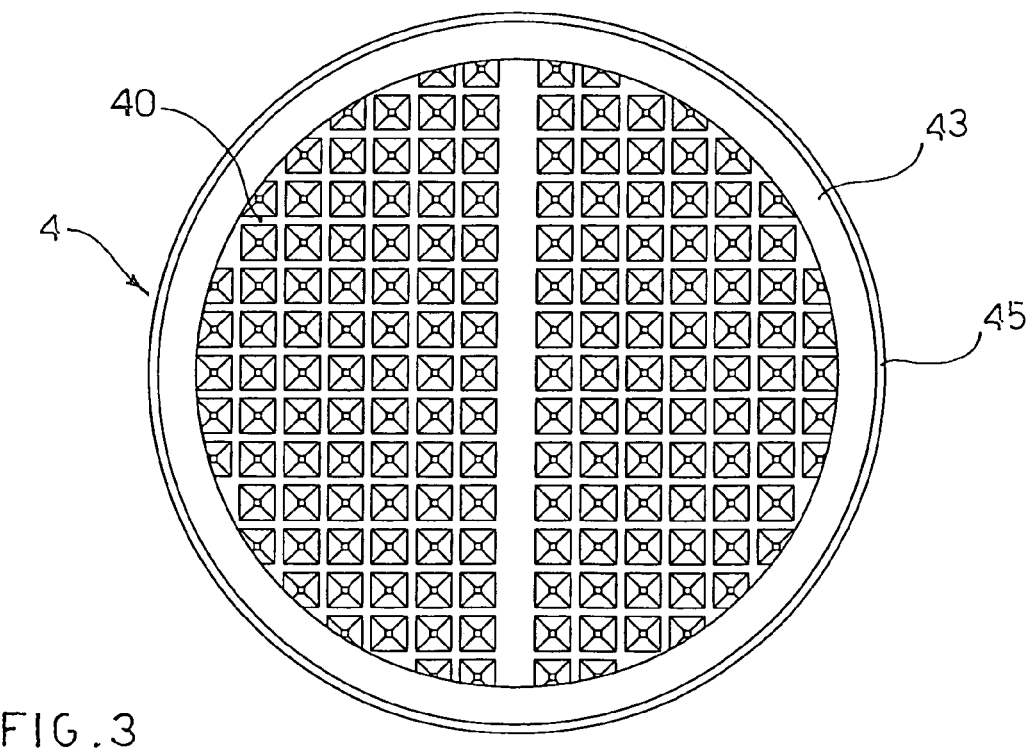
FIG. 3 is a bottom plan view, illustrating the filter of the cartridge of FIG. 1.

As shown in FIG. 3, the filter 4 is substantially disc-shaped with an outside diameter of the same size or slightly smaller than the inside diameter of the container 2, so that it can be placed inside it. The filter 4 comprises a disc-shaped filter wall 40 which has an annular peripheral portion 43 designed to abut onto the thicker annular portion 23 of the bottom of the container.

A plurality of holes 44 is made in the filter wall 40 and in the central portion 41. The holes are defined by seats with a frusto-pyramid shape to allow the liquid beverage to pass from the top to the bottom and to retain the granular or powdered product, above the filter 4, inside the cartridge 1.

The side rim of the peripheral portion 43 of the filter 4 has a collar 45 which protrudes radially outwards. In this manner, when the filter 4 is placed on the bottom of the container 2, the collar 45 of the filter will be under the collar 25 of the container, so that it is retained on the bottom of the container.

Once the filter 4 has been positioned above the bottom wall 20 of the container 2, the container 2 is filled with the coffee or with a soluble product which is placed over the filter 4. At this point the lid 6 is placed on the upper rim 31 of the sidewall 21 of the container 2, so as to close the container 2.

The lid 6 is fixed on the upper surface 31 of the top rim 30 of the container 2 using heat sealing, ultrasound sealing, glue or the like.

The lid 6 has micro-perforations designed to allow water and/or steam under pressure to pass. For this purpose the lid 6 can be made by means of one or more layers of filter paper or by means of one or more strips of microperforated plastic material.

Figure 4:
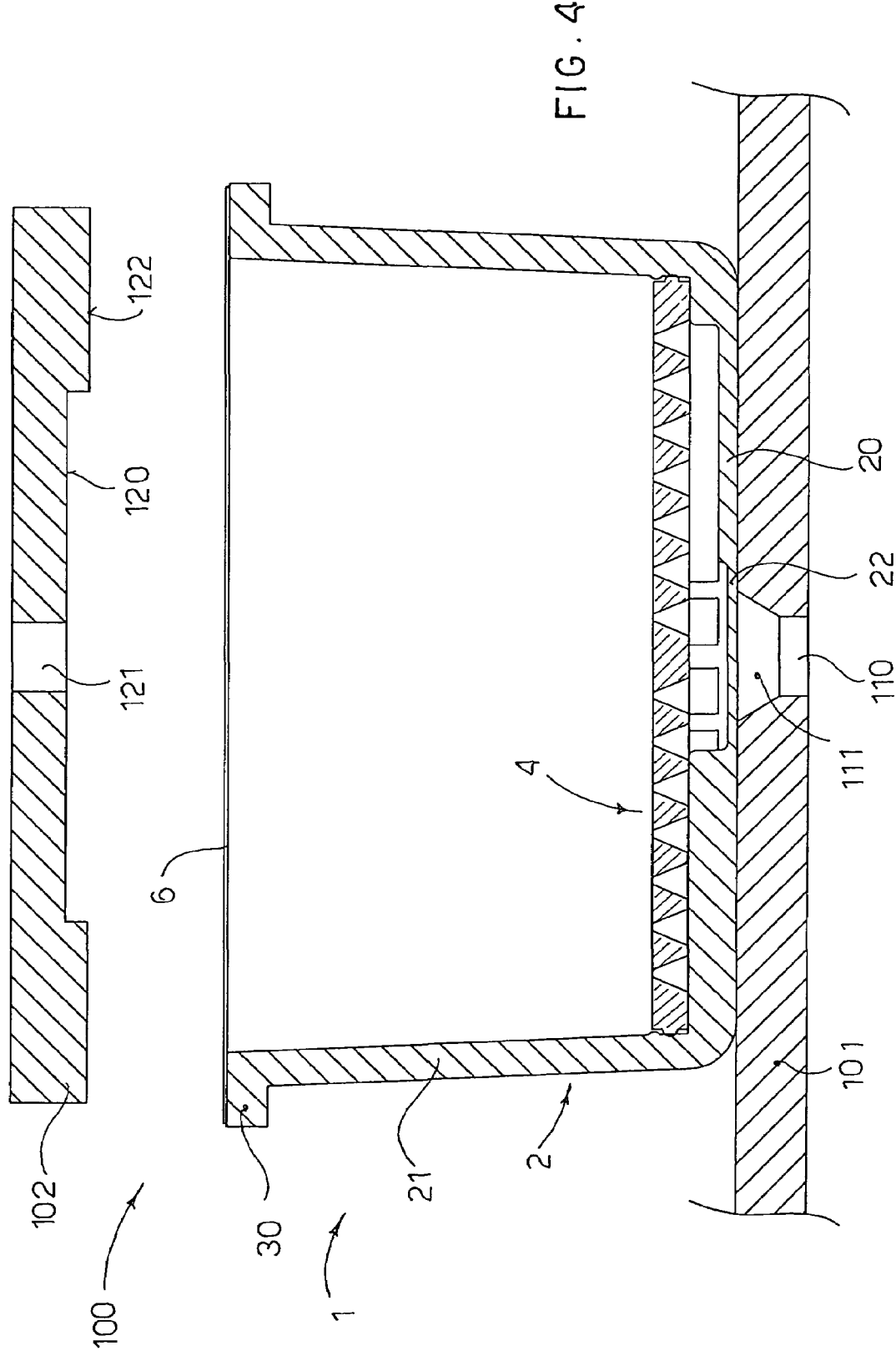
FIG. 4 is an axial sectional view, illustrating the cartridge of FIG. 1, assembled and placed in a machine for the extraction of a beverage from the cartridge, shown diagrammatically before the beverage extraction stage.
Figure 5:
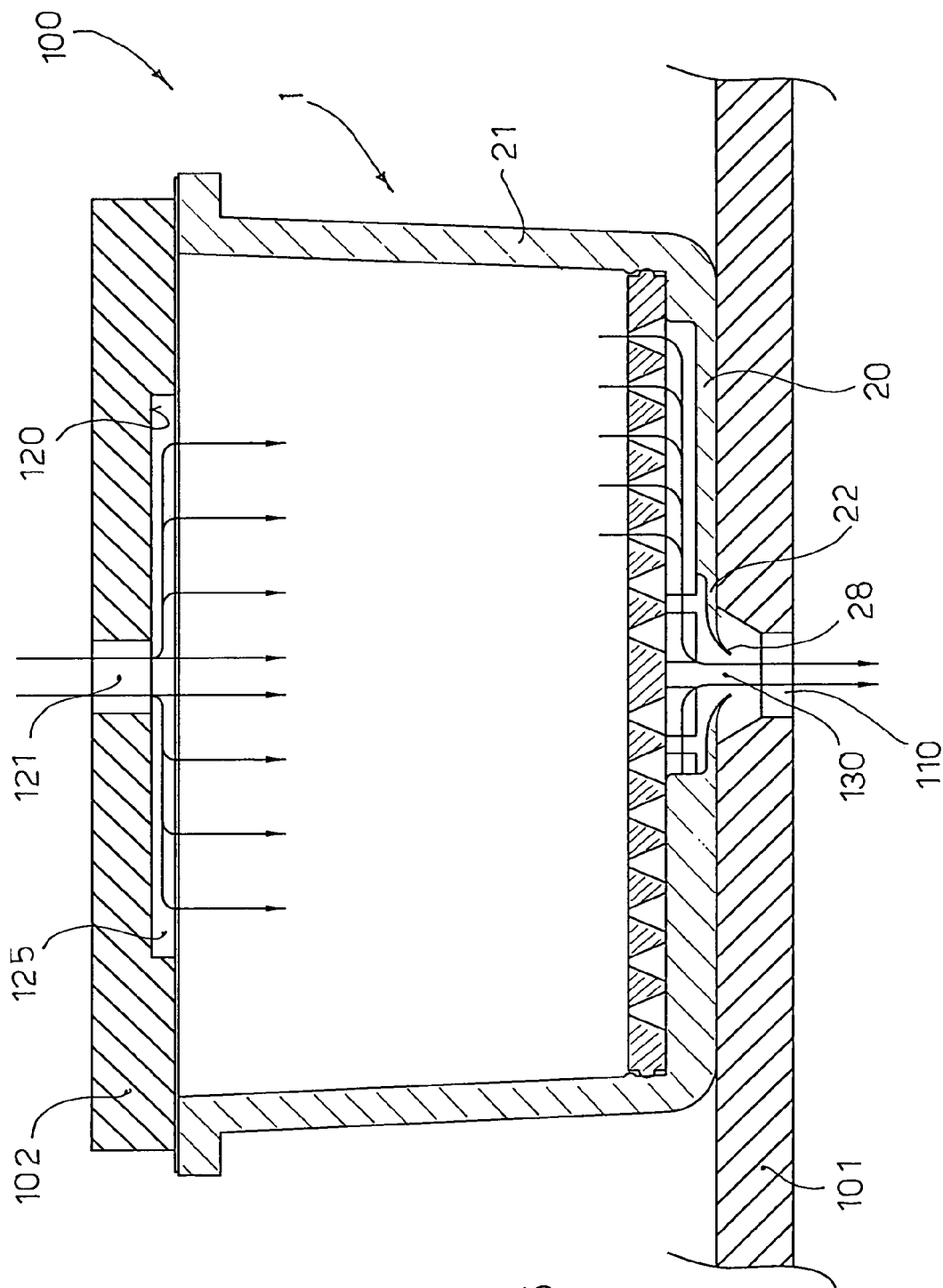
FIG. 5 is a diagrammatic axial sectional view, as in FIG. 4, illustration the cartridge during the beverage extraction stage.

With reference to FIGS. 4 and 5, there follows a description of the machine for the extraction of a beverage from the cartridge 1 according to the invention. Such an extraction machine, designated as a whole with reference numeral 100, comprises a support plate 101 on which the cartridge 1 is placed and a pressure plate 102, set above the support plate 101 at such a height as to be above the lid 6 of the cartridge 1 when the cartridge 1 is placed on the support plate 101.

The inner surface of the pressure plate 102 has a recessed circular part 120 defined by a disc-shaped peripheral flange 122 projecting downward and designed to abut against a peripheral part of the lid 6, which is fixed to the surface 31 of the top rim 30 of the container 2.

The pressure plate 102 has a channel 121 positioned centrally and axially with respect to its recessed circular part 120. Hot water under pressure is introduced through the channel 121. It is clear that more than one channel for introduction of hot water under pressure can be provided.

The support plate 101 has a through hole 110 having a flared top part 111, designed to be positioned in register with the weakened circular portion 22 of the bottom wall 20 of the container 2. The hole 110 in the support plate defines a channel for outflow of the beverage.

The pressure plate 102 can translate vertically from a raised position (FIG. 4) to a lowered position (FIG. 5) in which the peripheral part 122 of the pressure plate presses tightly against the peripheral part of the lid 6. In this manner, as shown in FIG. 5, between the recessed part 120 of the pressure plate and the upper surface of the lid 6 a pressurization chamber 125, which is filled with hot water under pressure coming from the duct 121, is created. Then, the hot water under pressure passes from the pressurization chamber 125 into the cartridge 1 through the micro-perforations of the lid 6.

It is clear that the pressure plate 102 can be fixed and the support plate 101 can translate from a lowered position to a raised position in which, pushing the cartridge 1 upwards, the peripheral part of the lid 6 is pressed against the peripheral flange 122 of the pressure plate 102 so as to create the pressurization chamber 125.

In the present description, a lid 6 with micro-perforations to be able to use the cartridge 1 with an extraction machine like that described above is described. However, the lid 6 may not have micro-perforations so that a tightly sealed cartridge 1 is obtained. In this case the pressure plate 102 will have per se known means to perforate the lid 6 and to inject hot water under pressure into the cartridge 1.

In order to make a beverage with the cartridge 1 and the machine 100 according to the invention, the user inserts the cartridge in the extraction machine 100 and starts the extraction cycle. At this point the top pressure plate 102 is lowered, creating the pressurization chamber 125.

Following this, hot water under pressure is introduced through the channel 121 of the pressure plate 102 and passes through the microperforations in the lid 6, coming into contact with the coffee or with the soluble product contained in the cartridge 1. At this point the inside of the cartridge is pressurized by the hot water.

The pressurization of the water—and thus of the inside of the cartridge—is maintained for a pre-set period of time until the breakable portions 28 of the weakened area 22 of the cartridge bottom break because of the pressure and thus create apertures 130 from which the beverage can flow towards the outside of the cartridge. Following breaking of the breakable portions 28, the beverage formed in the cartridge, passing through the holes 44 of the filter and through the outflow apertures 130, flows out into the duct 110 of the support plate and is collected in a cup placed beneath the extraction machine 100 by the user.

The thickness of the breakable portions 28 is chosen during moulding of the container 2, so as to ensure an optimal pressurization time. This pressurization time must be sufficient to allow the aromas of the product to dissolve in the hot water under pressure inside the cartridge and the beverage to form. Different thicknesses of the breakable portions 28 can be chosen according to the type of beverage to be extracted.

For example, for a weak beverage thin breakable portions 28 are chosen, so as to reach low maximum pressures and short pressurisation times. On the other hand, if a more concentrated beverage is wanted, thicker breakable portions 28 are chosen, so as to reach high maximum pressures and long pressurisation times.

It should be noted that thanks to the rigidity of the container of the cartridge 1, pressurisation thereof can be maintained for the desired time, without problems due to deformation of the container.

Figure 6:
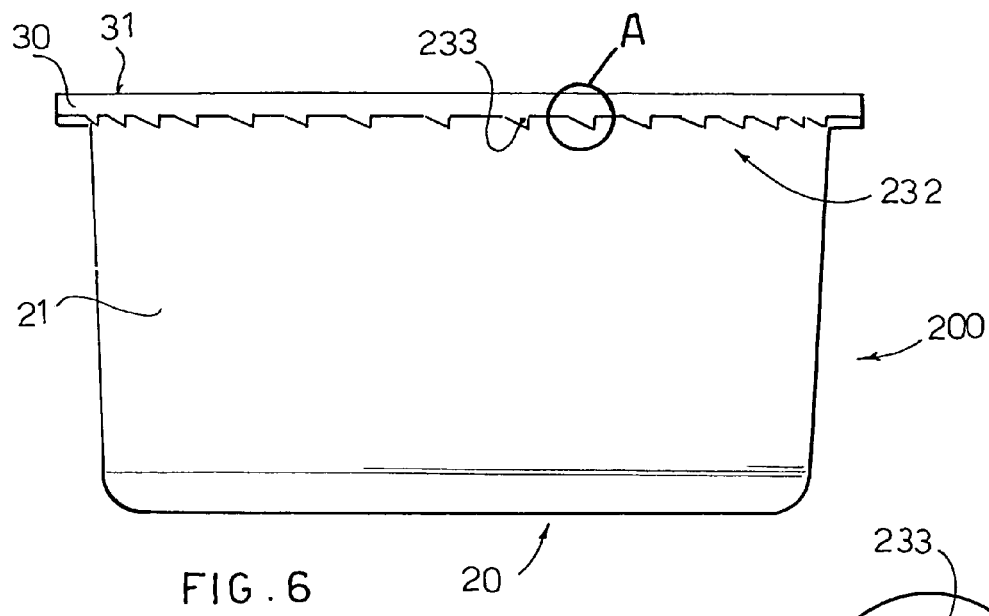
FIG. 6 is a side elevational view of the cartridge of FIG. 1 assembled, in which a modification has been made in the top rim.

Like or corresponding elements to those already described are indicated hereunder with the same reference numerals and detailed description thereof is omitted. FIG. 6 illustrates a cartridge 200 according to a second embodiment, in which the only modification has been made in the bottom surface 232 of the top rim 30 of the container 2 of the cartridge 200.

Figure 6A:
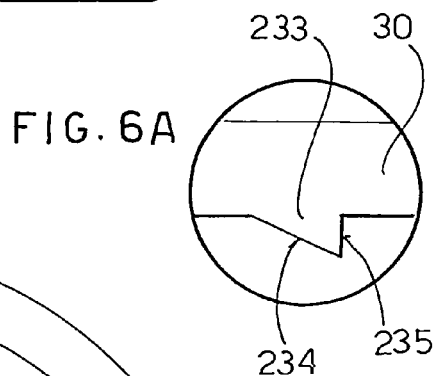

Said bottom surface 232 of the rim of the container is substantially knurled and has a plurality of downward projecting parts 233. As shown in FIG. 6A, each projecting part 232 is shaped as a serrated tooth and is defined by an entry side 233 slanting with respect to the bottom surface of the rim 30 and by an abutment side 235 perpendicular to the bottom surface of the rim 30.

Said cartridge 200 is adapted to be able to be used in a filter holder of a coffee machine, such as a bar machine for example, in which the ground coffee is placed directly in the filter-carrier. However, to accommodate the cartridge 200 the apparatus for extraction of coffee also need to be slightly modified.

Figure 7:
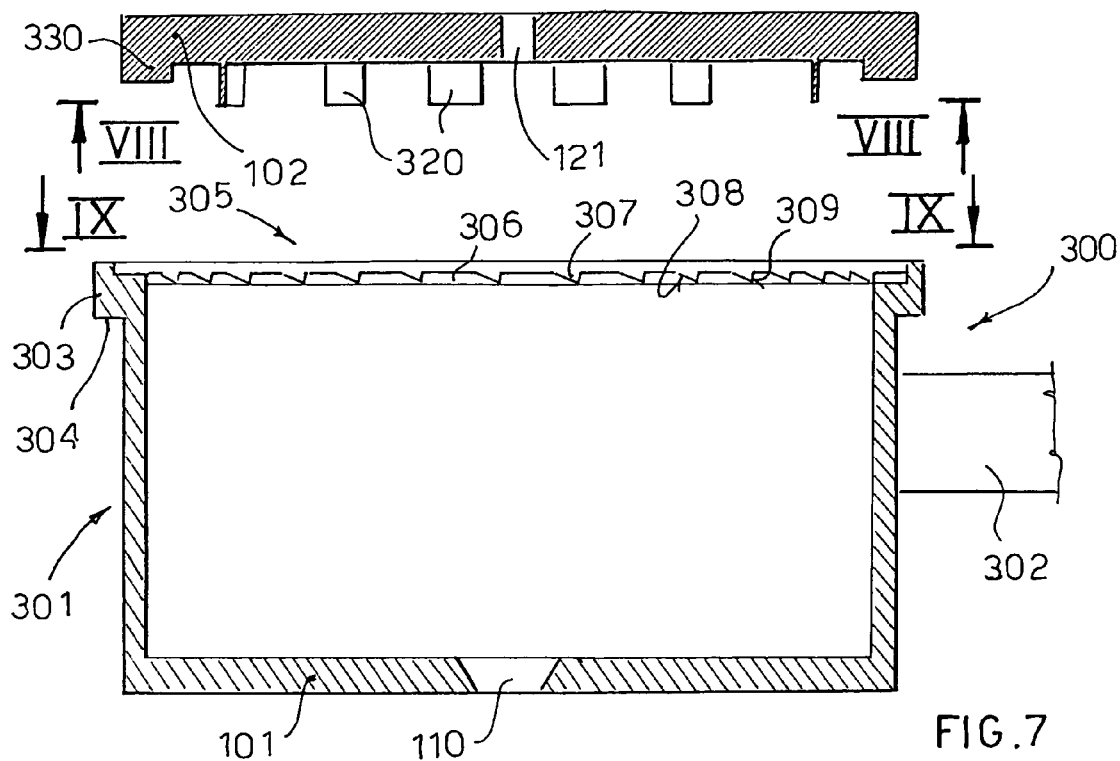
FIG. 7 is a diagrammatic axial sectional view, partially broken off, illustrating a machine for extraction of a beverage from a cartridge of FIG. 6.

FIG. 7 shows an apparatus 300 for extraction of coffee which has a filter holder 301 and a top plate 102.

Figure 8:
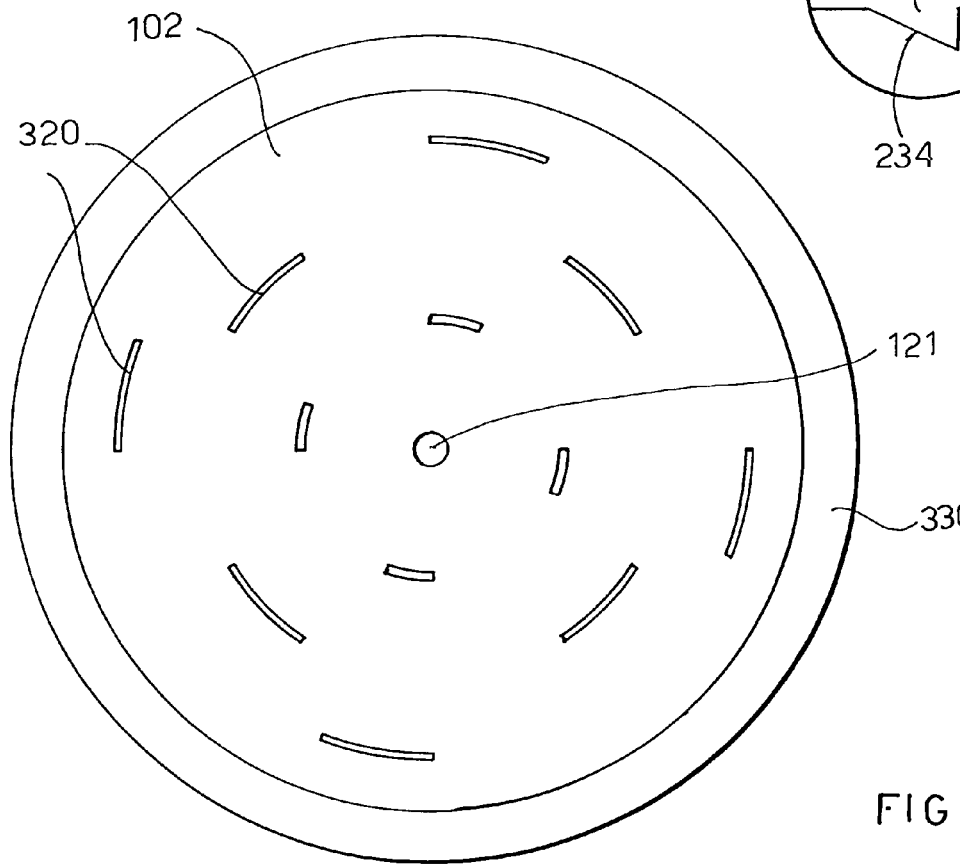
FIG. 8 is a bottom plan view, taken along the plane of section VIII-VIII of FIG. 7, illustrating the bottom part of the top plate of the machine of FIG. 7.

The top plate 102 has a downward projecting circumferential abutment rim 330 which encloses a plurality of downward projecting blades disposed in scattered positions, as shown in FIG. 8. The top plate 102 has one or more holes 121 centrally for introduction of hot water under pressure.

The filter holder 301 is shaped as a substantially cylindrical container open at the top for insertion of the filter and provided with a bottom wall 101 which has one or more openings 110 for output of the beverage.

The filter holder 301 has a top rim 303 which protrudes radially outwards giving rise to an outer bottom abutment surface 304 which couples in a screwing relationship with a threaded portion (not shown) of the top plate 102. For this purpose, the filter holder 301 has a handle 302 (shown broken off) to allow the user to couple it to the top plate 102.

Figure 9:
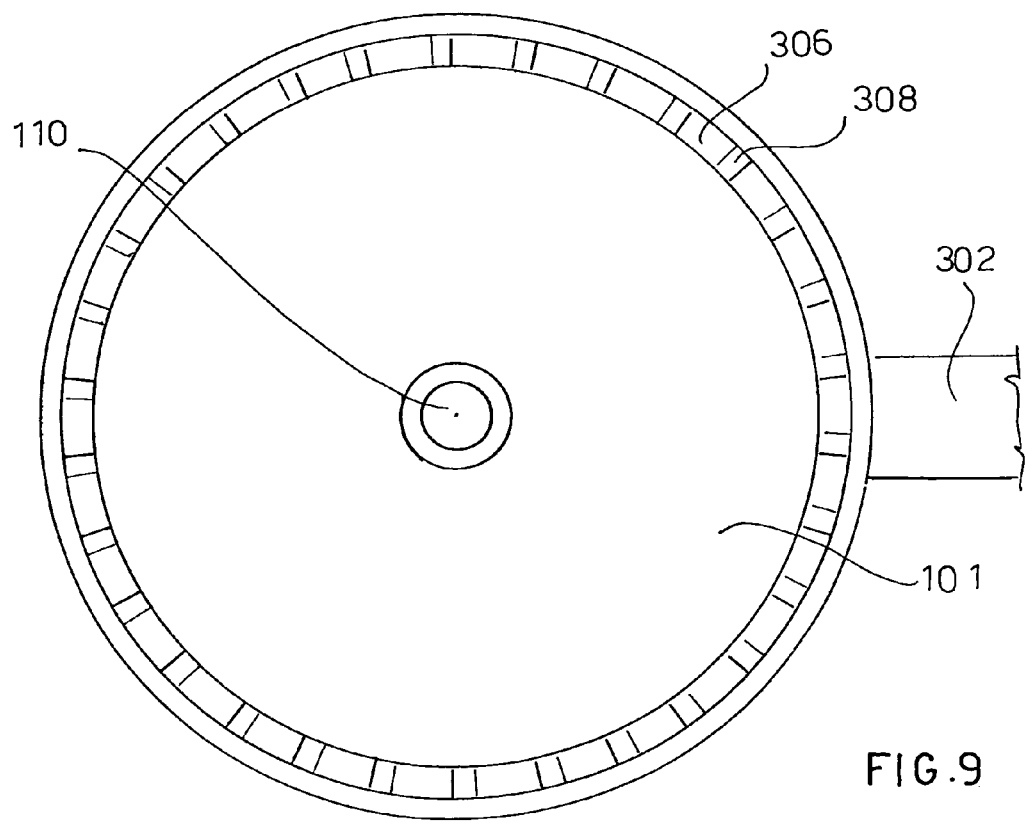
FIG. 9 is a top plan view taken along the plane of section IX-IX of FIG. 7, illustrating the top rim of the filter holder of the machine of FIG. 7.

The top rim 303 of the filter holder has a knurled top surface matching the bottom surface 232 of the top rim of the cartridge 200. Thus, as shown in FIGS. 7 and 9, the top surface 305 of the top rim 303 of the filter holder comprises a plurality of upward projecting parts 306 which give rise to respective recessed parts 307. Each upward projecting part 306 is defined by a perpendicular abutment edge 309 and an oblique entry edge 308.

Figure 10:
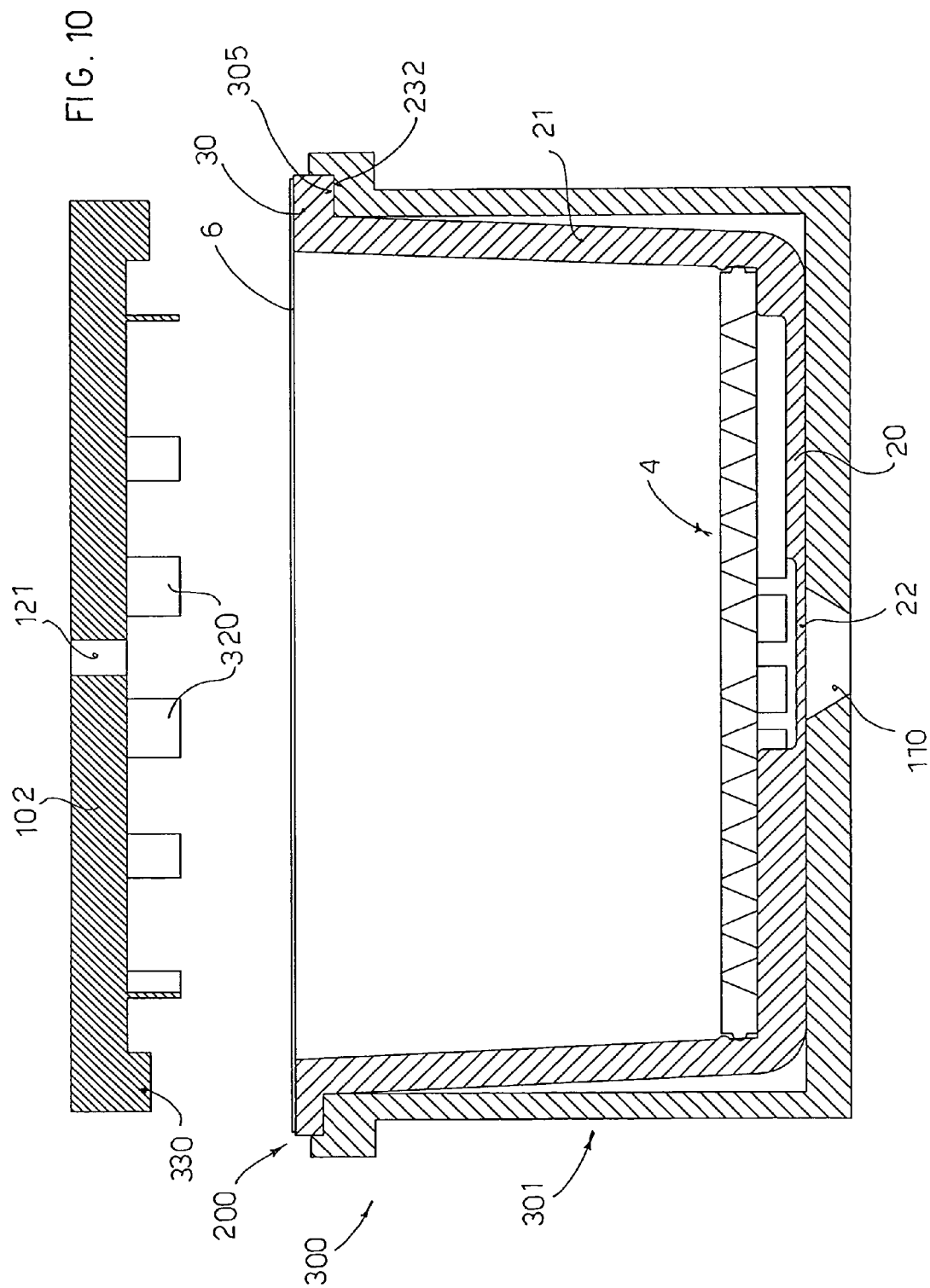
FIG. 10 is an axial sectional view, illustrating the cartridge of FIG. 6 disposed in the apparatus for extraction of a beverage of FIG. 7, before the beverage extraction stage.

In this manner, as shown in FIG. 10, when the cartridge 200 is inserted into the filter holder 301, the knurled surface 232 of the rim of the cartridge engages with the knurled surface 305 of the rim of the filter holder. That is to say the downward projecting parts 233 of the knurled surface 232 of the cartridge engage in the recessed parts 307 of the knurled surface 305 of the filter holder. As a result, the abutment walls 235 of the knurled surface 232 of the cartridge abut against the abutment walls 309 of the knurled surface 305 of the rim of the filter holder, preventing relative rotation of the cartridge 200 with respect to the filter holder, when the filter holder 301 is screwed beneath the top plate 102.

Figure 11:
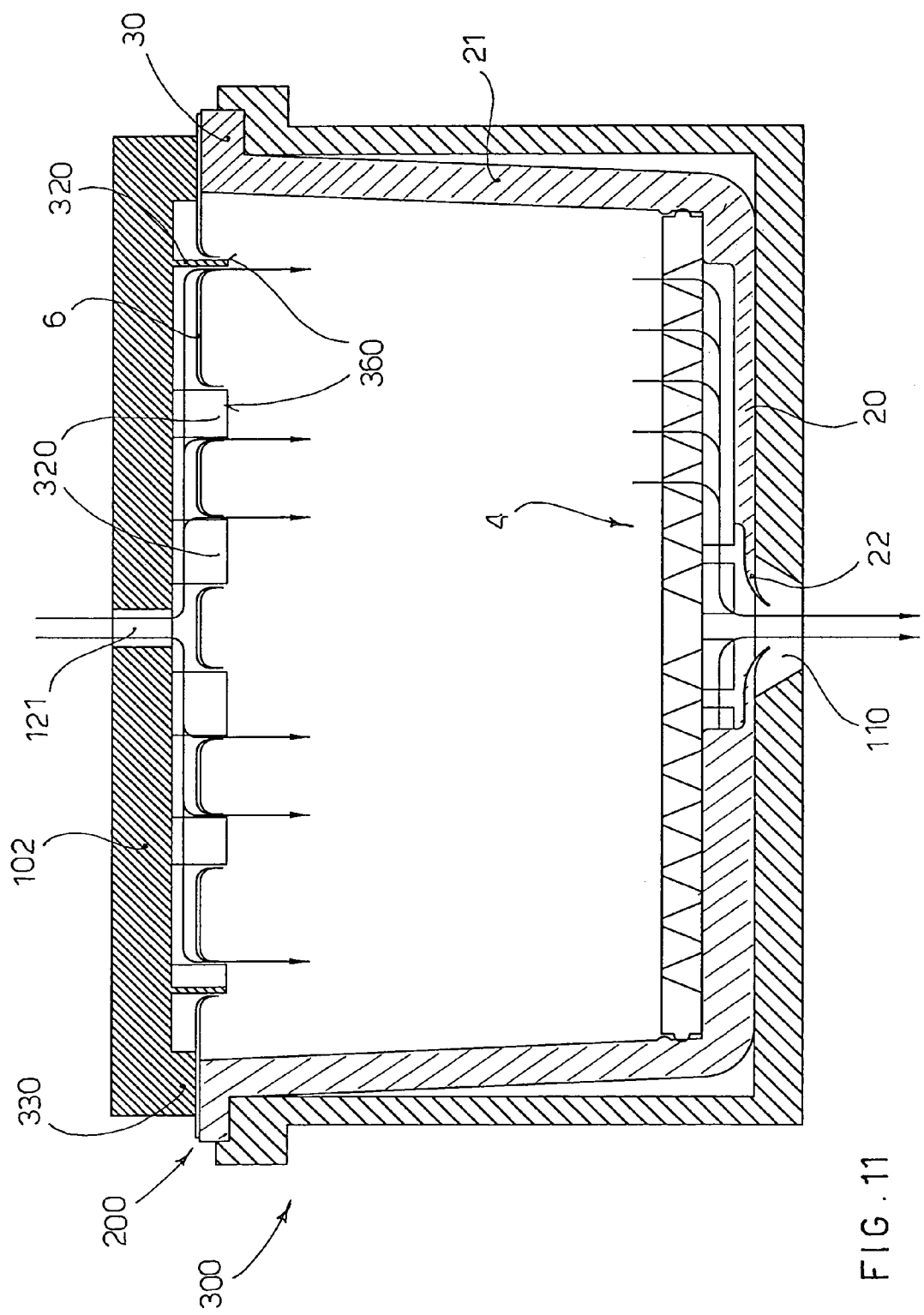
FIG. 11 is a diagrammatic axial sectional view, illustrating the apparatus of FIG. 10 during the beverage extraction stage.

Furthermore, as shown in FIG. 11, when the filter holder 301 is brought near to the top plate 102, the blades 320 of the top plate pierce the lid 6 generating openings 360 through which the hot water under pressure coming from the input hole 121 of the top plate 102 passes. Thus, the extraction procedure for the beverage proves substantially the same as that described in the first embodiment of the invention.

It is obvious that the bottom knurled surface 232 of the top rim of the container can be applied to any type of cartridge, even one without the bottom wall that can be broken by pressure.

Numerous changes and modifications of detail within the reach of a person skilled in the art can be made to the present embodiment of the invention, without departing from the scope of the invention, as set forth in the appended claims.

The invention claimed is:

1. A cartridge (1; 200) for coffee or soluble products for the production of a beverage, comprising:
    a container (2) designed to contain coffee or soluble product,
    a lid (6) set on the top of the container so as to define an upper wall through which hot water under pressure enters the container (2) in order to produce the beverage, and
    a filter (4) designed to be positioned inside said container (2) above a bottom wall (20) of the container through which the beverage leaves,
    wherein
    said bottom wall (20) of the container has at least one breakable portion (28) designed to break when the liquid inside the cartridge reaches a pre-set pressure, so as to form at least one aperture (130) to allow the beverage to be extracted from the cartridge (1), said at least one breakable portion (28) being obtained by means of grooves (27) formed in a weakened portion (22) of the bottom wall (20) of the cartridge (1) so that at least one breakable portion (28) is thinner than the weakened portion (22).

2. A cartridge (1; 200) of claim 1, wherein said weakened portion (22) is thinner than the bottom wall (20) of the cartridge (1).

3. A cartridge (1; 200) of claim 1, wherein said weakened portion (22) is substantially circular in shape and is set in a central portion of said bottom wall (20).

4. A cartridge (1; 200) of claim 1, comprising two breakable portions (28) arranged in a cross shape.

5. A cartridge (1; 200) of claim 1, wherein in the inner surface of the bottom wall (20) there are provided ribs (24, 24', 24") designed to support said filter (4) so as to define a chamber between said filter (4) and said bottom wall (20) to flow the filtered beverage out.

6. A cartridge (1; 200) of claim 1, wherein said lid (6) is made through one or more layers of micro-perforated material to allow the passage of hot water under pressure into the cartridge (1).

7. A cartridge (1; 200) of claim 1, wherein said container (2) is made by injection moulding of plastic material, such as polypropylene and the like.

8. An apparatus (300) for extraction of a beverage comprising:
    a top plate (102) provided with at least one hole (121) through which the pressurised hot water passes, and
    a filter-holding container (301) into which is inserted a filter, which can be coupled beneath said top plate (102) and is provided with at least one outlet hole (110) through which the beverage is extracted,
    wherein on the top rim (303) of said filter holder there is formed a substantially knurled surface (305) designed to cooperate with the matching knurled bottom surface (232) of the top rim (30) of a cartridge (200), according to claim 7, designed to be inserted in said filter holder (301), to avoid relative rotation of the cartridge (200) with respect to the filter holder (301),
    wherein said top plate (102) has a plurality of blades (320) projecting downward to pierce the lid (6) of the cartridge (200), inserted in said filter holder (301).

9. A method of producing a beverage from a cartridge (1; 200), containing coffee or a soluble product, comprising:
    introduction of hot water under pressure into the cartridge, through the lid (6) of said cartridge,
    maintaining the pressure inside the cartridge for an optimal pre-set time, so that the aromas of the coffee or of the soluble product dissolve in the hot water under pressure, and
    breakage of at least one breakable portion (28) obtained by means of grooves (27) formed in a weakened portion (22) of the bottom wall (20) of said cartridge, due to the pressure of the hot water under pressure inside it, so as to allow the beverage to be extracted from said cartridge through at least one aperture (130) obtained by breaking said at least one breakable portion (28).

* * * * *